United States Patent Office 2,803,913
Patented Aug. 27, 1957

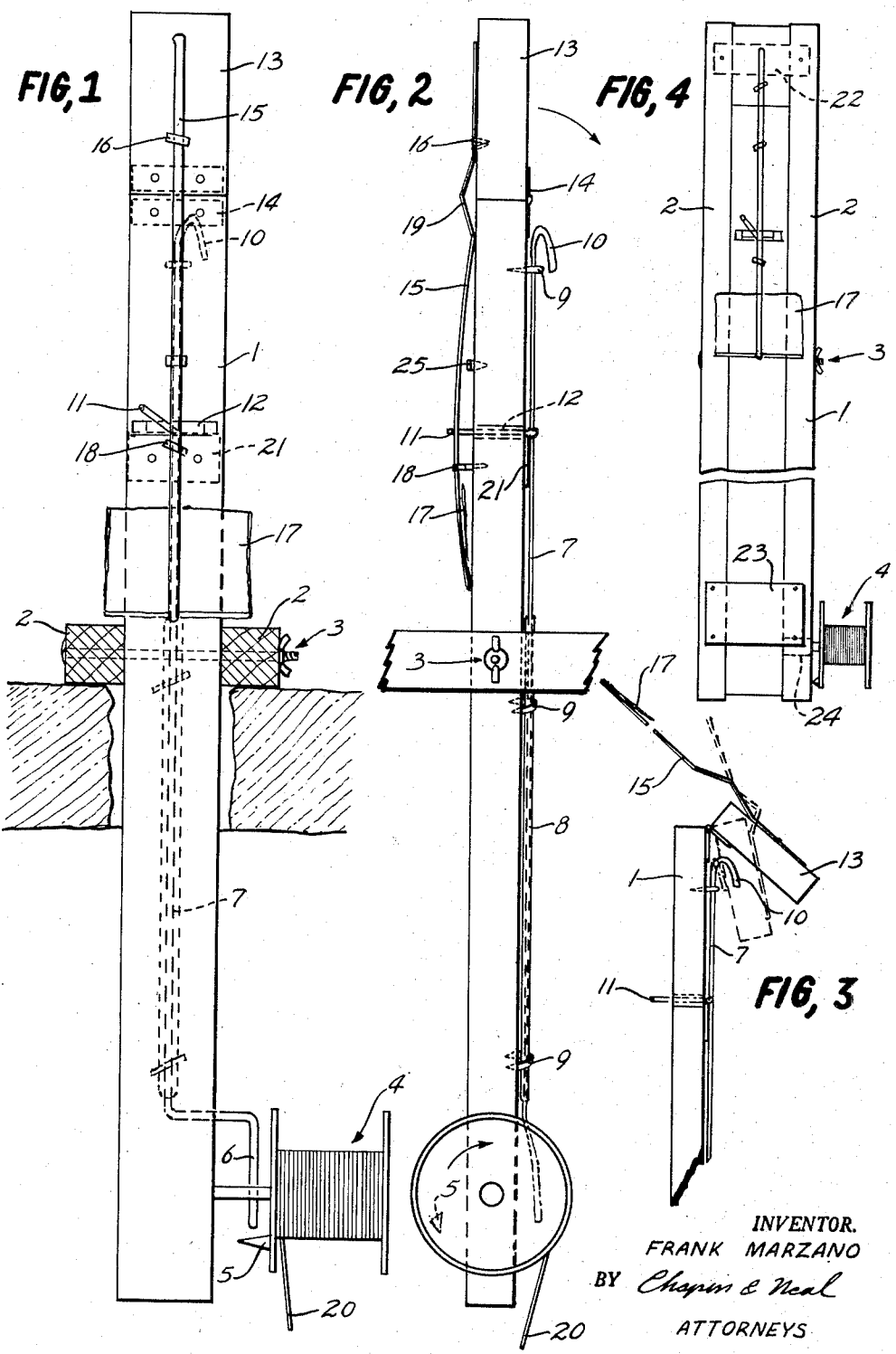

2,803,913

TIP-UP FOR ICE FISHING

Frank Marzano, Springfield, Mass.

Application September 10, 1956, Serial No. 608,967

1 Claim. (Cl. 43—17)

This invention relates to an improvement in tip-up signals for ice fishing.

The general object of the invention is to provide certain improvements in the signaling mechanism, more particularly to improve such mechanism in the type of tip-up shown and claimed in my prior Patent No. 2,725,659, issued December 6, 1955.

In the accompanying drawing:

Fig. 1 is a front elevational view of a tip-up embodying the invention; the tip-up being in set position;

Fig. 2 is a side elevational view of the device of Fig. 1;

Fig. 3 is a fragmentary view similar to Fig. 1 showing the manner of oscillating the signal after the latter is released; and Fig. 4 is a front elevational view on a smaller scale, parts being broken away, showing the device in folded position.

Referring to the drawing the device is shown as comprising a post 1 pivoted between side bars 2 by a bolt and wing nut as indicated at 3. As will be apparent upon loosening the wing nut the post 1 can be swung to a position at right angles to side bars 2, as shown in Figs. 1 and 4, and held in that position by tightening the wing nut. When so set up the lower end of the post may be inserted in a hole in the ice with the side bars extending over the surface of the ice, in accordance with the usual manner in which such devices are used and as shown in Fig. 1.

A line and reel of any suitable form, generally indicated at 4 is rotatably mounted at the lower end of post 1, the side of the reel being provided with a finger 5 adapted to engage an arm 6 extending from the lower end of an elongated shaft 7 which extends upwardly along the post 1. The lower portion of the shaft 7 extends through a tube 8 which may be filled with an anti-freeze substance to maintain free rotatability of the crank in freezing temperatures. Shaft 7 is rotatably mounted on the post in any suitable manner as by staples 9.

The upper end of the shaft 7 is bent downwardly as indicated at 10, to form a cam arm for a purpose later described. Adjacent hook 10 the shaft 7 is provided with an arm 11 which extends through a transverse slot 12 in the post 1, the engagement of the ends of the slot by the arm 11 limiting the rotation of the shaft.

A block 13 is hinged as at 14 to the upper end of the post 1 to swing rearwardly in the direction of the arrow as viewed in Fig. 2. A flag staff 15 is fixed at one end to the front face of block 13, as by a staple 16, and is provided at its free end with a "flag" 17 formed of red, or other brightly colored, material.

When the device is in set-up position as in Figs. 1 and 2 the staff 15 extends downwardly along post 1 and to one side of arm 11, Fig. 1, and is engaged beneath a hook 18 opening to the side opposite arm 11. The staff 15 is formed of flexible spring metal and is bent as at 19 to strain the staff between the post 1 and the hook 18 to bias the block toward rotation about the hinge 14. With the parts in the position of Figs. 1 and 2 if a fish takes the hook, not shown, which is attached to the line 20 of reel 4, the resulting rotation of the reel as the line is drawn out causes finger 5 to engage the arm 6 thus turning shaft 7 and causing arm 11 to force the staff 15 from beneath hook 18. The resulting release of the staff from restraint causes block 13 to swing about hinge 14 as shown in Fig. 3. The block 13 is made of sufficient weight to overbalance the weight of the staff 15 and flag 17 so that the block swings downwardly into engagement with the cam arm 10. As the shaft 7 is oscillated by repeated engagement of arm 6 by the finger 5, cam arm 10 swings between a position substantially at right angles to the rear face of post 1 as shown in full lines and a position nearly parallel thereto, as shown in dotted lines in Fig. 3. Cam arm 10 therefore acts to constantly oscillate block 13, and staff 15 with its flag 17, between the full line and dotted line positions of Fig. 3, the weight of the block tending to return the cam arm 10 to the dotted line position in which arm 6 is positioned in the path of finger 5.

If the fish just nibbles or releases itself from the hook, or if the staff is otherwise tipped up the flag, although it is moved to a generally upright position, is not oscillated and the fisherman knows that while the device needs to be re-set, no fish is on the line to require immediate attention.

Post 1 is preferably provided on its rear face with a wear plate 21 along the lower edge of slot 12 to prevent undue abrasion of the slot by the oscillation of arm 11.

When not in use the device, upon loosening of the wing nut 3, may be folded, as shown in Fig. 4, for carrying or storage. The side bars 2 are connected adjacent one end by a cross brace 22 which maintains the bars 2 in parallel relationship when the wing nut is loosened, and acts as a stop to properly position the post in its folded relation to the side bars. Preferably a strip of leather or similar material 23 is secured at its ends to the opposite faces and adjacent the opposite ends of bars 2 bridge the space between the bars. As in the device of my prior patent this member 23 forms a convenient pocket to house the hook when the device is in folded condition. Also, as in my prior construction, the side bar which is adjacent the reel is notched as at 24 to accommodate the reel shaft when the device is collapsed, and a suitable catch 25 is preferably provided beneath which the staff 15 may be engaged when the device is not in use.

The action of cam arm 10 imparts a characteristic and effectively noticeable form of movement to the flag, since an unusually vigorous movement of the hook 10 may toss the block 13 away from the cam arm and such variations in vigor of movement of the fish on the line renders the flag movements erratic which is most effective in drawing the attention of the fisherman and gives some indication of the kind and character of the fish which has taken the hook.

What is claimed is:

In a tip-up for ice fishing including a post, means to support the post upright in an opening in the ice with its lower end submerged, a shaft extending longitudinally of the post and mounted thereon for limited rotation, a fishing reel rotatably mounted on the post adjacent its lower end, a finger extending from the side of the reel and rotatable therewith, and an arm extending from the lower end of the shaft into the path of rotation of said finger and engageable thereby upon initial rotation of the reel to turn the shaft; a cam arm extending from the upper end of said shaft adjacent to but below the upper end of the post, a member hinged to the upper end of the post for swinging movement from a position of substantial alignment with the post and a position of engagement with said cam arm, a staff fixed at one end to said member and provided on its free end with a flag, the staff extending downwardly along the post when said member is in substantial alignment with the post, said staff including means urging said member out of alignment with the post and toward engagement with the cam arm, a catch releasably holding the staff in said downwardly extending position, and an arm extending from said shaft and engageable with the staff to release the latter from said catch upon rotation of the shaft by said finger and permit said member to swing into engagement with said cam arm to be oscillated thereby upon each successive rotative movement of the shaft.

References Cited in the file of this patent

UNITED STATES PATENTS

| | | |
|---|---|---|
| 434,426 | Costellow | Aug. 19, 1890 |
| 2,589,610 | Fowler | Mar. 18, 1952 |
| 2,651,875 | Brockman | Sept. 15, 1953 |
| 2,725,659 | Marzano | Dec. 6, 1955 |